3,048,752
INSTRUMENT STABILIZING SYSTEM
Charles D. Bock, New York, N.Y., assignor to American Bosch Arma Corporation, a corporation of New York
Filed Oct. 15, 1949, Ser. No. 121,560
20 Claims. (Cl. 318—19)

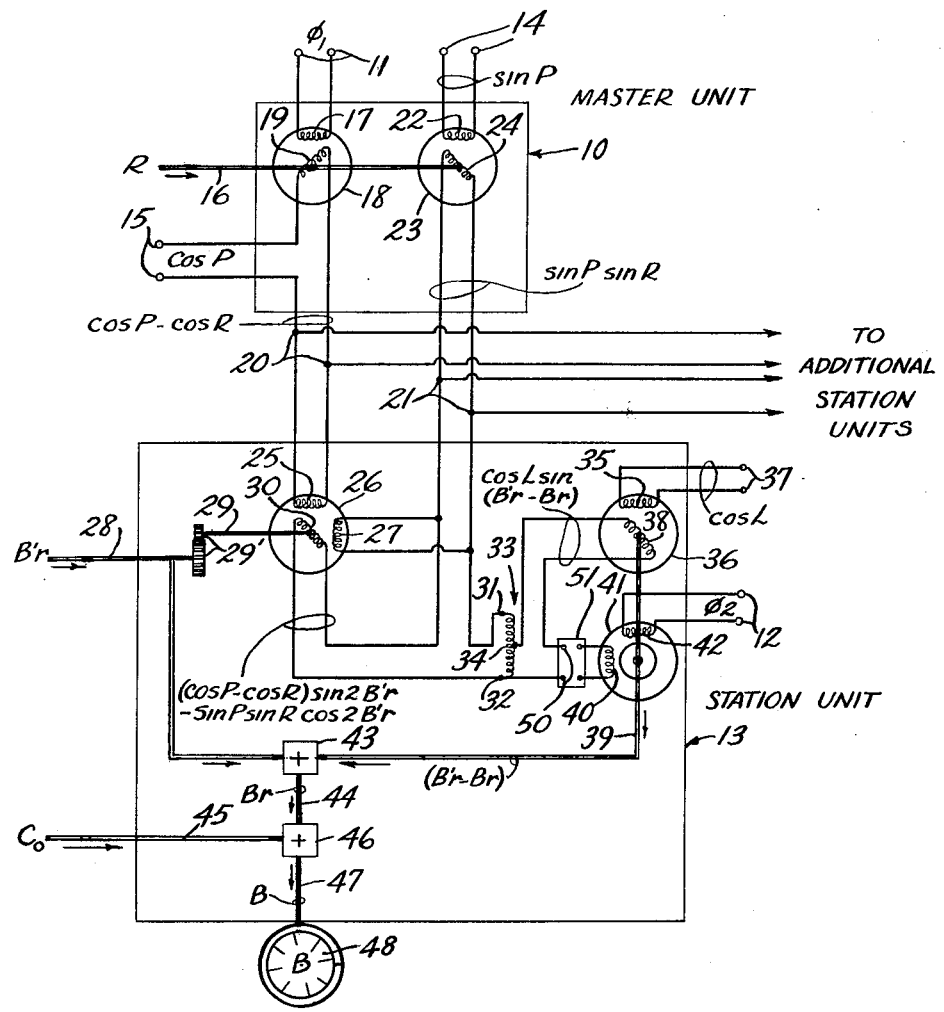

This invention relates to a fire control instrument stabilizing system, and has particular reference to a system for solving the deck tilt correction angle for multiple instrument three-axis stabilization installations.

A measurement of the director train angle of a traget, measured in the deck plane by the observer on the observing vessel, hereinafter called "own ship," gives data from which the true bearing of the target may be found by applying the deck tilt correction angle to the director train angle to produce relative bearing of the target in the horizontal plane, and adding that result to the course of own ship.

The calculation of deck tilt correction angle from identities which relate quantities in the horizontal plane to quantities in the deck plane is now familiar to those versed in the art. Two of these identities, derived by spherical trigonometry, are $$\sin Br \cos L = \sin B'r \cos R \text{ and } \cos Br \cos L =$$
$$\cos B'r \cos P + \sin B'r \sin P \sin R$$

wherein $Br$ is the relative target bearing, i.e., the angle between the vertical plane through the fore-and-aft axis of own ship and the vertical plane through the line of sight measured in the horizontal plane clockwise from the bow; $R$ is the roll angle; $P$ is the pitch angle; $L$ is the level angle, and $B'r$ is the director train angle, i.e., the angle between the fore-and-aft axis of own ship and the vertical plane through the line of sight measured in the deck plane clockwise from the bow.

In accordance with the present invention, means are provided for effecting a solution for the deck tilt correction, defined as $(B'r - Br)$, from the aforementioned two equations by a favorable substitution of these quantities in trigonometric reduction formulae, and the subsequent transformation of the resulting equation into the equation:

$$\sin (B'r - Br) \cos L = \tfrac{1}{2}((\cos P - \cos R)\sin 2B'r +$$
$$\sin P \sin R - \sin P \sin R \cos 2B'r)$$

which is the solution equation. The angle $(B'r - Br)$ can be obtained from this equation and, if the value $B'r - Br$ is subtracted from the known $B'r$ and the result, $Br$, is added to the course of own ship, $Co$, a solution for the true bearing, $B$, of the target is obtained, where $B$ is defined as the angle in the horizontal plane between a fixed azimuth and a vertical plane through the line of sight measured clockwise from the fixed azimuth, and $Co$ is the angle between the same fixed azimuth and the vertical plane through the fore-and-aft axis of own ship, measured in the horizontal plane.

In further accord with the present invention, the aforementioned means includes three electromechanical induction resolvers for synthesizing a signal proportional to the right-hand side of the solution equation from electrical signal inputs of $\cos P$ and $\sin P$ and mechanical inputs of $R$ and $B'r$ for angularly positioning the resolver rotors.

In a preferred embodiment of the invention, suitable inputs proportional to $\sin P$ and $R$ are fed to one of the three resolvers and the resulting $\sin P \sin R$ output signal voltage is impressed on one stator winding of a second resolver, while the second stator winding of the second resolver is energized by a voltage proportional to a signal $(\cos P - \cos R)$ produced by subtracting the $\cos R$ output of the third resolver from the $\cos P$ input signal. The rotor of the second resolver is displaced by an amount $2B'r$, and the $\sin P \sin R$ signal is added to the rotor winding output of the second resolver, thereby producing a signal whose amplitude is proportional to $$((\cos P - \cos R) \sin 2B'r - \sin P \sin R \cos 2B'r$$
$$+ \sin P \sin R)$$

A suitable portion of this signal is matched against the output voltage of the rotor winding of a fourth resolver, this output voltage being proportional to the product of the excitation voltage of the resolver stator winding and the sine of the rotor displacement angle, so that with an excitation voltage proportional to $\cos L$, the displacement of the rotor winding is proportional to $(B'r - Br)$, in the matched condition.

The input shafts of a mechanical differential are displaced according to the $B'r$ input and the $(B'r - Br)$ solution, thereby causing the displacement of the output shaft of the differential to be proportional to $Br$. One input shaft of a second mechanical differential is displaced by the output shaft of the first differential and the second input shaft is displaced by an amount proportional to $Co$, thereby causing a displacement of the output shaft proportional to $Br + Co$, or $B$, the above-defined true bearing of the target.

It will be seen that the system of this invention affords separation of the computer into two units, vis., a master unit and one or more station units, in which the outputs of the master unit, viz., ($\sin R \sin P$) and ($\cos P - \cos R$), are common inputs to all the station units, thereby reducing to a minimum the number of elements required for each additional observing station. Also, only two resolvers and three booster amplifiers are required for each additional station, thereby affording a saving of two resolvers and two booster amplifiers for each station other than the first. Furthermore, since the angle $B'r - Br$ is small under most conditions of operation, the degree of accuracy of the new system in effecting the solution for $B'r - Br$, and the consequent accuracy of the $Br$ solution is greater than that obtainable in systems in which the solution for $Br$ is carried out in a chain of resolvers driven at one speed, and numerous instruments accordingly may be accurately stabilized for deck tilt.

The single FIGURE shows a preferred embodiment of my invention.

Referring to the drawing, it will be observed that the system of this invention is composed of the master unit 10 and any number of remote station units, of which one representative unit, 13, is shown. The master unit 10 includes two electromechanical resolvers 18 and 23 and also each station unit contains two electromechanical resolvers 26 and 36. Each such electromechanical resolver comprises a rotor winding arranged on a shaft for rotation through an angle within the field of two stator windings arranged in space quadrature. The energization of a single stator winding by an applied voltage, induces a voltage in the rotor winding, which is proportional to the product of the applied voltage and the sine or cosine of the angle of displacement of the rotor from its defined zero position. The energization of both stator windings by respective applied in-phase voltages, sets up a resultant magnetic field in the stator. This induces a voltage in the rotor winding, which is proportional to the algebraic sum of the product of one applied voltage and the cosine of the angle of displacement of the rotor from its defined zero position, and the product of the other applied voltage and the sine of the angle of displacement of the rotor from its defined zero position. Further details of construction and operation of the electromechanical resolver may be had upon reference to Patent No. 2,467,646, issued April 19, 1949.

It will be understood that the input signal to each stator winding of the electromechanical resolvers shown in the drawing is transmitted through a booster amplifier, which is essentially a power amplifier with a voltage gain of unity. These power amplifiers are not shown in the drawing in the interest of simplicity. As shown in the drawing, one phase, $\phi_1$, of a two-phase constant alternating voltage source is applied to terminals 11 of master unit 10, while the other phase, $\phi_2$, is applied to terminals 12 of station unit 13. Electrical signals proportional to sin $P$ and cos $P$ are derived from $\phi_1$ in a pitch resolver of a gyrostable element. The cos $P$ voltage induced in one rotor winding of said pitch resolver is impressed on terminals 15 and the sin $P$ voltage induced in the other rotor winding is impressed on terminals 14 of master unit 10.

The sin $P$ voltage applied to terminals 14 energizes stator winding 22 of resolver 23 and constant voltage $\phi_1$ applied at terminals 11 energizes stator winding 17 of resolver 18. The roll angle, $R$, is supplied as a mechanical input to shaft 16 for rotating rotor windings 19 and 24 of resolvers 18 and 23 through that angle, $R$. This displacement of rotor winding 19 of resolver 18 through an angle proportional to $R$, and the energization of stator winding 17, results in the induction in rotor 19 of a voltage whose amplitude is proportional to cos $R$. Inasmuch as rotor winding 19 is connected in series with input terminals 15, receiving a voltage proportional to cos $P$, the amplitude of the voltage at terminals 20 is equal to the difference between the amplitudes of the voltage at terminals 15 (cos $P$) and the output voltage of rotor winding 19 (cos $R$), so that the amplitude of the voltage at terminals 20 is proportional to cos $P$—cos $R$.

The energization of the stator winding 22 of the other resolver, 23, by the input signal voltage proportional to sin $P$, and the displacement of its rotor winding 24 by shaft 16 through angle $R$, results in the induction in rotor winding 24 of a voltage, made available at terminals 21, whose amplitude is proportional to sin $P$ sin $R$.

The output terminals 20 of master unit 10 are connected to one stator winding 25 of resolver 26 which is accordingly energized by a voltage proportional to cos $P$—cos $R$, while terminals 21 are connected to the other stator winding 27 of resolver 26 to energize the same with a voltage proportional to sin $P$ sin $R$.

Mechanical input shaft 28 is displaced by the observer by an amount proportional to B′r, and drives the rotor 30 of resolver 26 through shaft 29 and gearing 29′, and the gearing is arranged to double the angular displacement of shaft 28, so that the rotor winding 30 of resolver 26 is displaced by an amount proportional to 2B′r. The amplitude of the output voltage accordingly induced in rotor winding 30 of station resolver 26 is proportional to (cos $P$—cos $R$) sin 2B′r—sin $P$ sin $R$ cos 2B′r.

The rotor winding 30 of station resolver 26 is connected in series with terminals 21 and is also connected in series with input terminals 31, 32 of voltage divider 33. Voltage divider 33 may be of the tapped transformer winding type shown, so that the amplitude of the voltage across terminals 31, 32 is the algebraic sum of the amplitudes of the voltage output of rotor winding 30 and the voltage at terminals 21. Hence, the amplitude of the input voltage to voltage divider 33 is proportional to (cos $P$—cos $R$) sin 2B′r
  —sin $P$ sin $R$ cos 2B′r+sin $P$ sin $R$ The amplitude of the output voltage of voltage divider 33, measured between terminals 32, 34, is proportional to ½((cos $P$—cos $R$) sin 2B′r
  —sin $P$ sin $R$ cos 2B′r+sin $P$ sin $R$)

which is shown to be the same as sin (B′r—Br) cos $L$ by the aforementioned solution equation.

The stator winding 35 o fthe fourth resolver 36 is connected to terminals 37, across which is impressed an input signal voltage whose amplitude is proportional to cos $L$, and which is derived from $\phi_1$ in a level resolver. As stated, the cos $L$ value voltage is impressed across terminals 37, and the value cos Zd may be applied alternatively, if it is desired to obtain the director train angle as will be described.

The rotor winding 38 of resolver 36 is mechanically coupled to the shaft 39 of motor 41 and driven thereby through an input angle in a manner to be described. The resulting voltage induced in rotor winding 38 accordingly is proportional to the product of cos $L$ and the sine of the angle of rotation of shaft 39 from its defined zero position. Rotor winding 38 is connected in series with output terminals 32, 34 of voltage divider 33 and input terminals 50 of amplifier 51 which contains a suitable damping network, the output voltage of which energizes control field winding 40 of motor 41, so that control field winding 40 of motor 41 is energized by a voltage proportional to the difference between the output of voltage divider 33 and the voltage induced in rotor winding 38 of resolver 36.

The main field winding 42 of motor 41 is energized from $\phi_2$ of the electric supply, and therefore motor 41 drives shaft 39 and thereby drives rotor winding 38 until the output voltage of rotor winding 38 is matched to the output voltage of voltage divider 33, so that zero voltage is applied to input terminals 50 of amplifier 51, control field winding 40 is thereby deenergized and motor 41 stops.

Inasmuch as the output voltage of rotor winding 38 is matched to the output voltage of voltage divider 33, i.e., a voltage proportional to sin (B′r—Br) cos $L$ and as the stator winding 35 is energized by a voltage proportional to cos $L$, it follows that the rotor winding 38 and shaft 39 are displaced through an angle proportional to (B′r—Br).

As shown in the drawing, shafts 28 and 39 are connected to the input gears of a conventional mechanical differential 43, so that their angles of rotation are subtracted, with the result that the displacement of the output shaft 44 of the differential 43 is equal to the difference between the displacements of shafts 28 and 39, or is proportional to B′r—(B′r—Br), or Br.

The output shaft 44 of differential 43 drives one input gear of mechanical differential 46, whose other input gear is driven by shaft 45 which is displaced through an angle proportional to own ship course, Co, as determined by a gyrocompass, so that the angular displacement of the output shaft 47 of the differential 46 is equal to the sum of the displacements of shafts 44 and 45, or is proportional to Br+Co or B, true target bearing. The output shaft 47 of differential 46 drives dial 48 so that the quantity B is indicated on dial 48 and may be used in fire control computing instruments, for instance.

It will be understood that although the mathematical operations of subtracting B′r—Br from B′r and the addition of Br to Co are shown performed by mechanical differentials 43 and 46, respectively, the subtraction and addition may be conveniently performed in self-synchronous differentials by well-known methods when the B′r or Co input signals are available as electrical outputs of self-synchronous transmitters, as is usually the case.

Notwithstanding that the operation of the deck tilt correction computer has been described in connection with the problem of finding the true bearing of a target from a knowledge of the deck train angle, the apparatus of this invention can be adapted to a three-axis stabilized mount to reverse the operation and calculate the director train angle from a given true target bearing. The equation by which sin B′r—Br is found in that case is sin (B′r—Br) cos Zd=½((cos $P$—cos $R$) sin 2Br
  +sin $P$ sin $R$—sin $P$ sin $R$ cos 2Br)

where Zd is the cross level angle, the cosine voltage value of which would then be impressed across terminals 37 instead of the cos $L$ voltage value with the operation otherwise remaining substantially the same as that described.

Although a preferred embodiment of the invention has been illustrated and described herein, it is to be understood that the invention is not limited thereby, but is susceptible of changes in form and detail within the scope of the appended claims.

I claim:

1. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a third of said angles and a rotor winding, means for combining at least part of the voltage induced in the rotor winding of said third electrical means with the voltage induced in the rotor winding of said fourth electrical means, motive means energized by the said combined voltages, and operative connections between the motive means and the rotor winding of said fourth electrical means for driving the same toward zero combined voltage position to provide a stabilizing angle for at least one of said gun fire control instruments.

2. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with said level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

3. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with said cross-level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

4. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a third of said angles and a rotor winding, means for combining the voltages induced in the rotor windings of said second and third electrical means with the voltage induced in the rotor winding of said fourth electrical means, motive means energized by the said combined voltages and operative connections between the motive means and the rotor winding of said fourth electrical means for driving the same toward zero combined voltage position to provide a stabilizing angle for at least one of said gun fire control instruments.

5. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, means for modifying the energization of one of said third stator windings with a voltage according with said other angle, a member driven in accordance with the target position, operative connections between said member and the rotor winding of said third electrical means for rotating the same, a fourth electrical means having a stator winding energized in accordance with a third of said angles and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

6. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with a voltage proportional to a trigonometric function of another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a voltage proportional to a trigonometric function of a third of said angles and a rotor winding, means for combining the voltages induced in the rotor windings of said second and third electrical means with the voltage induced in the rotor winding of said fourth electrical means, motive means energized by the said combined voltages, and operative connections between the motive means and the rotor winding of said fourth electrical means for driving the same toward zero combined voltage position to provide a stabilizing angle for at least one of said gun fire control instruments.

7. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with a voltage proportional to a trigonometric function of said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a voltage proportional to a trigonometric function of said level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

8. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with a voltage proportional to a trigonometric function of said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a voltage proportional to a trigonometric function of said cross-level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

9. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with a voltage proportional to a trigonometric function of another of said angles and a rotor winding driven in accordance with said one angle, a third electrical means having a pair of stator windings severally energized by the output voltages of said first and second electrical means and a rotor winding, means for modifying the energization of one of said third stator windings with a voltage in accordance with a voltage proportional to a trigonometric function of said other angle, a member driven in accordance with the target position, operative connections between said member and the rotor winding of said third electrical means for rotating the same, a fourth electrical means having a stator winding energized in accordance with a voltage proportional to a trigonometric function of a third of said angles and a rotor winding, means for combining at least part of the voltage induced in the rotor winding of said third electrical means with the voltage induced in the rotor winding of said fourth electrical means, motive means energized by the said combined voltages, and operative connections between the motive means and the rotor winding of said fourth electrical means for driving the same toward zero combined voltage position to provide a stabilizing angle for at least one of said gun fire control instruments.

10. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings severally energized by the output voltages of said first and second electrical means and a rotor winding, means for modifying the energization of one of said third stator windings with a voltage in accordance with a voltage proportional to a trigonometric function of said pitch angle, a member driven in accordance with the target position, operative connections between said member and the rotor winding of said third electrical means for rotating the same, a fourth electrical means having a stator winding energized in accordance with said level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

11. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings and a rotor winding, several electrical connections between the rotor windings of the first and second electrical means and the stator windings of said third electrical means, means in one of said electrical connections for modifying the voltage thereof in accordance with a voltage proportional to a trigonometric function of said other angle, a member driven in accordance with the target position, operative connections between said member and the rotor winding of said third electrical means for rotating the same, a fourth electrical means having a stator winding energized in accordance with a third of said angles and a rotor winding, means for combining the voltages induced in the rotor windings of said second and third electrical means, motive means energized in accordance with the difference between the voltage induced in the rotor winding of said fourth electrical means and the voltage output of said combining means, and operative connections between the motive means and the rotor winding of said fourth electrical means for driving the same in accordance with said voltage difference to provide a stabilizing angle for at least one of said gun fire control instruments.

12. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings and a rotor winding, several electrical connections between the rotor windings of the first and second electrical means and the stator windings of said third electrical means, means in one of said electrical connections for modifying the voltage thereof in accordance with a voltage proportional to a trigonometric function of said pitch angle, a member driven in accordance with the target position, operative connections between said member and the rotor winding of said third electrical means for rotating the same, a fourth electrical means having a stator winding energized in accordance with said level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage positioned to provide a stabilizing angle for at least one of said gun fire control instruments.

13. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings and a rotor winding, several electrical connections between the rotor windings of the first and second electrical means and the stator windings of said third electrical means, means in one of said electrical connections for modifying the voltage thereof in accordance with a voltage proportional to a trigonometric function of said pitch angle, a member driven in accordance with the target position, operative connections between said member and the rotor winding of said third electrical means for rotating the same, a fourth electrical means having a stator winding energized in accordance with said cross-level angle and a rotor winding, means for combining at least part of the voltage induced in the rotor winding of said third electrical means with the voltage induced in the rotor winding of said fourth electrical means, motive means energized by said combined voltages, and operative connections between the motive means and the rotor winding of said fourth electrical means for driving the same toward zero combined voltage position to provide a stabilizing angle for at least one of said gun fire control instruments.

14. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a third of said angles and a rotor winding, a voltage divider energized by the combined voltage induced in the rotor windings of said second and third electrical means, motive means energized by the difference between the output of said voltage divider and the voltage induced in the rotor winding of said fourth electrical means, and operative connections between the motive means and the rotor winding of said fourth electrical means for driving the same in accordance with said voltage difference to provide a stabilizing angle for at least one of said gun fire control instruments.

15. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a third of said angles and a rotor winding, means for combining at least part of the voltage induced in the rotor winding of said third electrical means with the voltage induced in the rotor winding of said fourth electrical means, motive means energized by the said combined voltages, operative connections between the motive means and the rotor winding of said fourth electrical means for driving the same toward zero combined voltage position, and differential means jointly driven by said member and said motive means to provide a target angle.

16. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with said level angle and a rotor winding, means for combining at least part of the voltage induced in the rotor winding of said third electrical means with the voltage induced in the rotor winding of said fourth electrical means, motive means energized by said combined voltages, operative connections between the motive means and the rotor winding of said fourth electrical means for driving the same toward zero combined voltage position, and differential means jointly driven by said member and said motive means to provide relative target bearing.

17. In a stabilizing system for gun fire control instruments, mounted on an unstable support having a stable element providing relative angles of pitch and roll of said support and level and cross-level angles, the combination of electrical means having an energized stator winding and a rotor winding rotated in accordance with said roll angle, a second electrical means having a stator winding, energized in accordance with said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with said cross-level angle and a rotor winding, means for combining at least part of the voltage induced in the rotor winding of said third electrical means with the voltage induced in the rotor winding of said fourth electrical means, motive means energized by said combined voltages, operative connections between the motive means and the rotor winding of said fourth electrical means for driving the same toward zero combined voltage position, and differential means jointly driven by said member and said motive means to provide a target train angle.

18. In a stabilizing system for gun fire control instruments mounted on an unstable support having a stable element providing relative angles of pitch and roll of said support and level and cross-level angles, the combination of electrical means having an energized stator winding and a rotor winding rotated in accordance with one of said angles, a second electrical means having a stator winding energized in accordance with another of said angles and a rotor winding driven in accordance with said one angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with a third of said angles and a rotor winding, means for combining at least part of the voltage induced in the rotor winding of said third electrical means with the voltage induced in the rotor winding of said fourth electrical means, motive means energized by the said combined voltages, operative connections between the motive means and the rotor winding of said fourth electrical means for driving the same toward zero combined voltage position, differential means jointly driven by said member and said motive means, second differential means jointly driven by said first differential means and in accordance with the course of said support to provide a target angle.

19. In a stabilizing system for gun fire control instruments mounted on an unstable support having a stable element providing relative angles of pitch and roll of said support and level and cross-level angles, the combination of electrical means having an energized stator winding and a rotor winding rotated in accordance with said roll angle, a second electrical means having a stator winding energized in accordance with said pitch angle and a rotor winding driven in accordance with said roll angle, a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means having a stator winding energized in accordance with said level angle and a rotor winding, means for combining at least part of the voltage induced in the rotor winding of said third electrical means with the voltage induced in the rotor winding of said fourth electrical means, motive means energized by said combined voltages, operative connections between the motive means and the rotor winding of said fourth electrical means for driving the same toward zero combined voltage position, differential means jointly driven by said member and said motive means, second differential means jointly driven by said first differential and in accordance with the course of said support to provide true target bearing.

20. In a stabilizing system for gun fire control instruments mounted on an unstable support having a stable element providing relative angles of pitch and roll of said support and level and cross-level angles, the combination of a master station including electrical means having an energized stator winding and a rotor winding rotated in accordance with one of said angles, and a second electrical means having a stator winding energized in accordance with another of said angles and a rotor winding driven in accordance with said one angle; a plurality of remote stations each including a third electrical means having a pair of stator windings severally energized by the output voltages of said first and second electrical means and a rotor winding, a member driven in accordance with the target position, operative connections between said member and the rotor winding of said third electrical means for rotating the same, a fourth electrical means adjacent each said third electrical means having a stator winding energized in accordance with a third of said angles and a rotor winding, means for combining the voltages induced in the rotor windings of said second and third electrical means with the voltage induced in the rotor winding of said fourth electrical means, motive means adjacent each said third electrical means energized by the output of said combining means, and operative connections between the motive means and the rotor winding of said fourth electrical means for driving the same toward zero combined voltage position to provide a stabilizing angle for said gun fire control instrument corresponding to each said remote station.

No references cited.